United States Patent
Lin

(10) Patent No.: US 9,146,154 B2
(45) Date of Patent: Sep. 29, 2015

(54) PHOTOELECTRIC CONVERSION DEVICE AND OPTICAL FIBER COUPLING CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 144 days.

(21) Appl. No.: 14/014,334

(22) Filed: Aug. 29, 2013

(65) Prior Publication Data

US 2014/0326906 A1 Nov. 6, 2014

(51) Int. Cl.
*G02B 6/36* (2006.01)
*G01J 1/02* (2006.01)
*G01J 1/42* (2006.01)
*G02B 6/42* (2006.01)
*G02B 6/32* (2006.01)

(52) U.S. Cl.
CPC ............... *G01J 1/0271* (2013.01); *G01J 1/029* (2013.01); *G01J 1/4228* (2013.01); *G02B 6/32* (2013.01); *G02B 6/42* (2013.01)

(58) Field of Classification Search
CPC .............. G02B 6/32; G02B 6/34; G02B 6/36; G02B 6/42; G02B 6/4204
USPC ............. 250/227.11, 227.24, 227.29, 227.32, 250/239; 385/73–75, 88, 89, 92, 93
See application file for complete search history.

(56) References Cited

U.S. PATENT DOCUMENTS

| 8,469,610 B2 * | 6/2013 | Shao et al. ........................ 385/93 |
| 2014/0178017 A1 * | 6/2014 | Lin ................................ 385/89 |

* cited by examiner

*Primary Examiner* — Kevin Pyo
(74) *Attorney, Agent, or Firm* — Novak Druce Connolly Bove + Quigg LLP

(57) ABSTRACT

A photoelectric conversion device includes a circuit board, light-emitting modules, light-receiving modules, an optical coupling module, and a protecting member. The light-emitting modules and the light-receiving modules are mounted on the circuit board. The optical coupling module is mounted on the circuit board, and includes first and second optical surfaces, a reflection surface, first converging lenses formed on the first optical surface and corresponding to the light-emitting modules and the light-receiving modules, and second converging lenses formed on the second optical surface and corresponding to the first converging lenses. The protecting member is mounted on the circuit board to shield the optical coupling module, the light-emitting modules, and the light-receiving modules, and only exposes the second converging lenses.

18 Claims, 6 Drawing Sheets

PHOTOELECTRIC CONVERSION DEVICE AND OPTICAL FIBER COUPLING CONNECTOR

BACKGROUND

1. Technical Field

The present disclosure relates to communication technologies, and particularly to a photoelectric conversion device and an optical fiber coupling connector.

2. Description of Related Art

An optical fiber coupling connector includes a photoelectric conversion device and a number of optical fibers. The photoelectric conversion device includes a circuit board, a number of light-emitting modules, a number of light-receiving modules, and an optical coupling module. The light-emitting modules, the light-receiving modules, and the optical coupling module are mounted on the circuit board. The optical fibers correspond to and are optically coupled with the light-emitting modules and the light-receiving modules one-to-one through the optical coupling module.

After the photoelectric conversion device is manufactured, other electronic elements, such as capacitors or resistors, are mounted on the circuit board by an installation device. However, the optical coupling module is easily damaged during the installation process.

Therefore, it is desirable to provide a photoelectric conversion device, and an optical fiber coupling connector with the photoelectric conversion device, to overcome or at least alleviate the above-mentioned problems.

DETAILED DESCRIPTION

Figure 1:
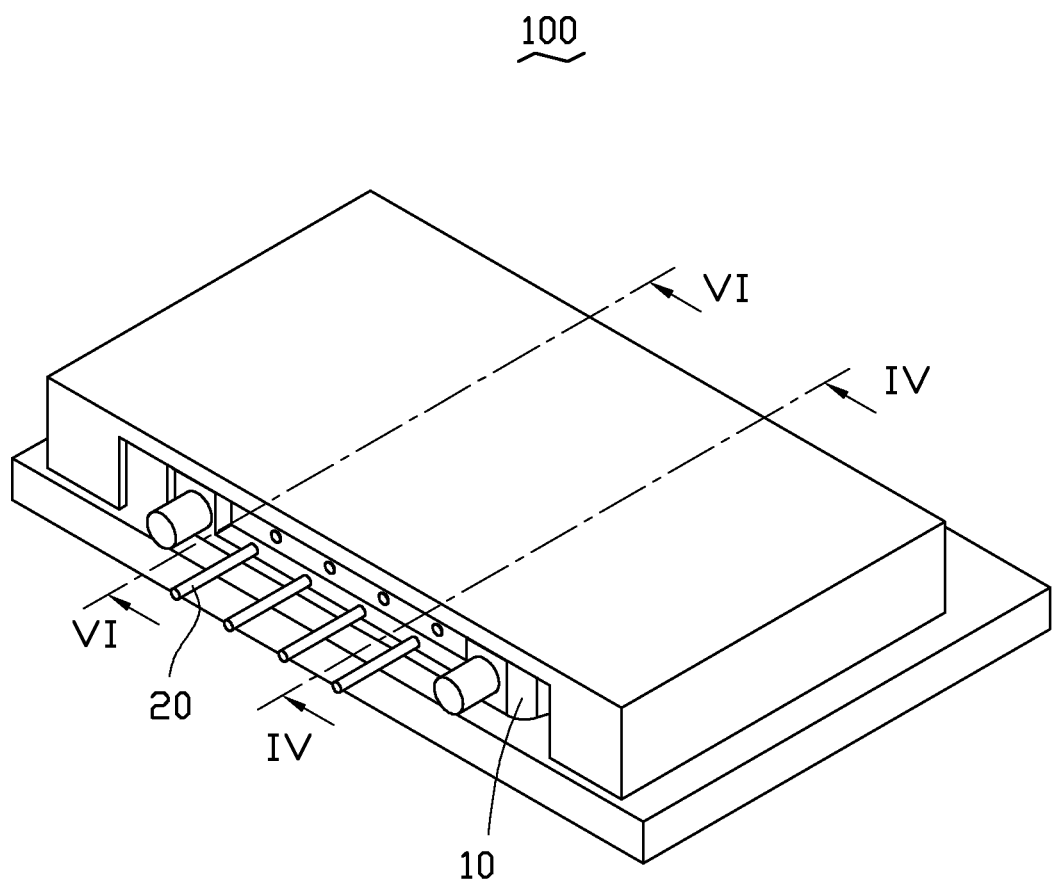
FIG. 1 is a schematic, isometric view of an optical fiber coupling connector, according to an exemplary embodiment.

FIG. 1 shows an optical fiber coupling connector 100, according to an exemplary embodiment. The optical fiber coupling connector 100 includes a photoelectric conversion device 10 and four optical fibers 20.

Figure 2:
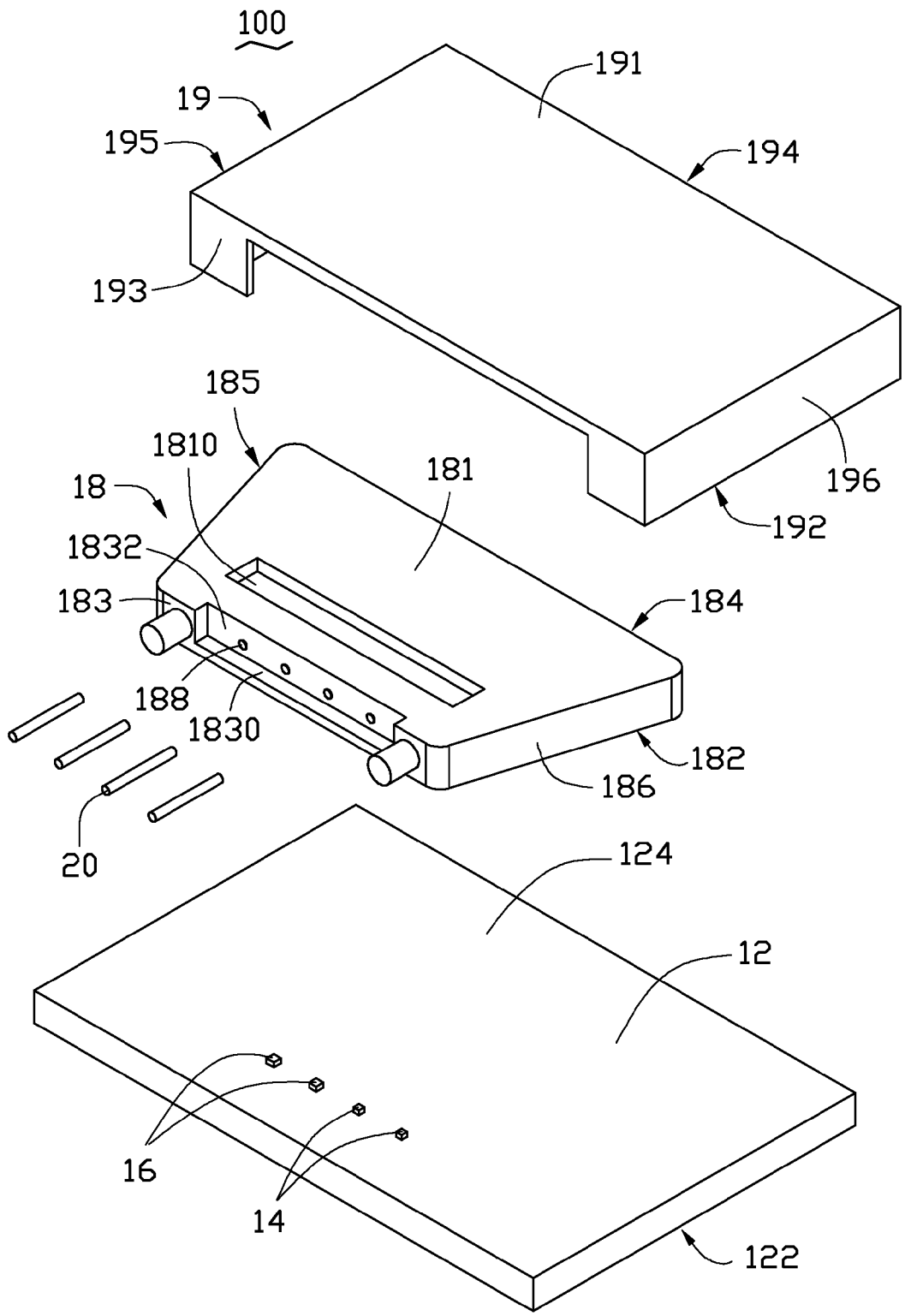
FIG. 2 is an exploded view of the optical fiber coupling connector of FIG. 1.
Figure 3:
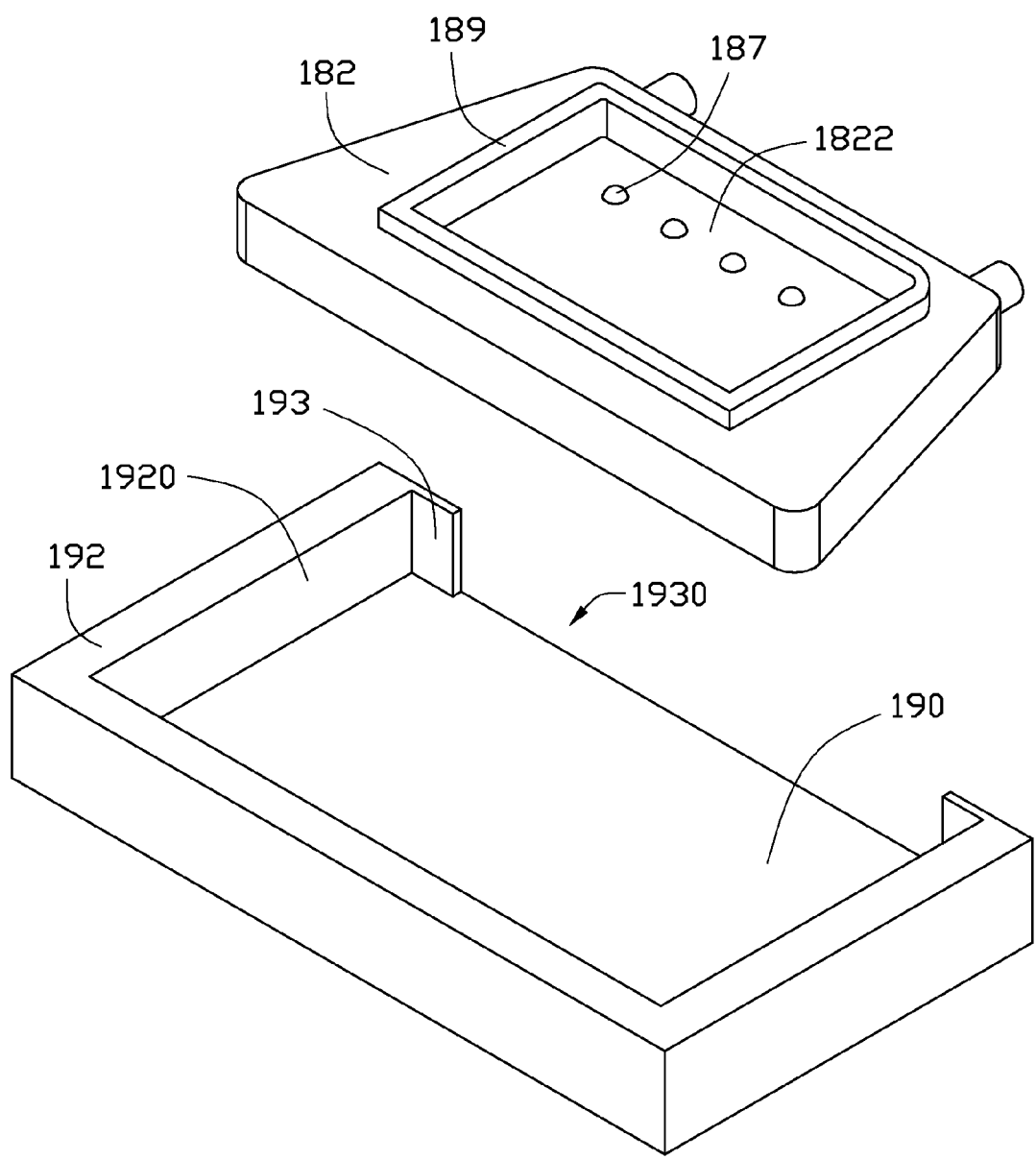
FIG. 3 is a partial view of FIG. 2, viewed from another angle.

FIGS. 1 and 2 show that the photoelectric conversion device 10 includes a circuit board 12, two light-emitting modules 14, two light-receiving modules 16, an optical coupling module 18, and a protecting member 19.

The circuit board 12 includes a first surface 122 and a second surface 124. The first surface 122 and the second surface 124 are positioned at opposite sides of the circuit board 12, and the first surface 122 is substantially parallel to the second surface 124.

The two light-emitting modules 14 and the two light-receiving modules 16 are mounted on the second surface 124 and are electrically connected to the circuit board 12. In detail, the light-emitting modules 14 and the light-receiving modules 16 are arranged in a straight line and are spaced from each other. In this embodiment, each of the light-emitting modules 14 is a vertical-cavity-surface-emitting laser (VCSEL) diode, and is configured for converting electric signals into optical signals to emit light. Each of the light-receiving modules 16 is a photo diode and is configured for receiving light to convert optical signals into electric signals.

FIGS. 2-5 show that the optical coupling module 18 includes a top surface 181, a bottom surface 182, a front surface 183, a back surface 184, a first side surface 185, a second side surface 186, four first converging lenses 187, four second converging lenses 188, and a support 189.

The top surface 181 and the bottom surface 182 are positioned at opposite sides of the optical coupling module 18, and the top surface 181 is substantially parallel to the bottom surface 182. The front surface 183 and the back surface 184 are positioned at opposite sides of the optical coupling module 18, and the front surface 183 is substantially parallel to the back surface 184. The first side surface 185 and the second side surface 186 are positioned at opposite sides of the optical coupling module 18. The front surface 183, the back surface 184, the first side surface 185, and the second side surface 186 are perpendicularly interconnected between the top surface 181 and the bottom surface 182. The first side surface 185 and the second side surface 186 are obliquely interconnected between the front surface 183 and the back surface 184.

The top surface 181 defines an elongated top recess 1810. The optical coupling module 18 further includes a first inner surface 1812, a second inner surface 1814, and a reflection surface 1816 in the top recess 1810. The first inner surface 1812 is positioned at a bottom of the top recess 1810, and is substantially parallel to the top surface 181. The second inner surface 1814 is positioned at a side of the top recess 1810, and is perpendicularly interconnected between the first inner surface 1812 and the top surface 181. The reflection surface 1816 is positioned at a side of the top recess 1810, opposite to the second inner surface 1814, and is obliquely interconnected between the first inner surface 1812 and the top surface 181.

The bottom surface 182 defines a rectangular bottom recess 1820. The optical coupling module 18 further includes a first optical surface 1822 at a bottom of the bottom recess 1820. The first optical surface 1822 is substantially parallel to the top surface 181 and the bottom surface 182.

The front surface 183 defines a cutout 1830. The optical coupling module 18 further includes a second optical surface 1832 in the cutout 1830. The second optical surface 1832 is substantially parallel to the front surface 183 and the back surface 184. The first optical surface 1822 is substantially perpendicular to the second optical surface 1832, and the reflection surface 1816 is oblique relative to the first optical surface 1822 and the second optical surface 1832. An included angle between a main plane of the first optical surface 1822 and a main plane of the reflection surface 1816 is about 45 degrees, and an included angle between a main plane of the second optical surface 1832 and a main plane of the reflection surface 1816 is about 45 degrees.

The first converging lenses 187 are formed on the first optical surface 1822 and are arranged apart from each other. In detail, the first converging lenses 187 are arranged in a straight line, and are aligned with the light-emitting modules 14 and the light-receiving modules 16 one-to-one. In this embodiment, each of the first converging lenses 187 is a convex lens.

The second converging lenses 188 are formed on the second optical surface 1832 and are arranged apart from each other. In detail, the second converging lenses 188 are arranged in a straight line, and correspond to the first converging lenses 187 one-to-one. In this embodiment, each of the second converging lenses 188 is a convex lens.

The support 189 is a substantially rectangular frame. The support 189 extends from the bottom surface 182 and away from the top surface 181. The support 189 extends along four edges of the bottom recess 1820, and surrounds the four edges of the bottom recess 1820.

The protecting member 19 includes a top wall 191, a bottom wall 192, a front wall 193, a rear wall 194, a first sidewall 195, and a second sidewall 196. The front wall 193, the first sidewall 195, the rear wall 194, and the second sidewall 196 are perpendicularly interconnected between the top wall 191 and the bottom wall 192. The front wall 193, the first sidewall 195, the rear wall 194, and the second sidewall 196 are connected to each other end-to-end and cooperatively form a receiving cavity 190 with the top wall 191 and the bottom wall 192. The bottom wall 192 is supported on the second surface 124 and defines a first opening 1920. The front wall 193 defines a second opening 1930. The first opening 1920 and the second opening 1930 communicate with the receiving cavity 190. In this embodiment, the protecting member 19 is made of high temperature resistant material, such as fiber polypropylene or ceramic.

The four optical fibers 20 correspond to the four second converging lenses 188. Each of the optical fibers 20 includes a substantially cylindrical core portion 22 and a cladding layer 24 wrapped around the core portion 22. The four core portions 22 are aligned with the four second converging lenses 188, respectively.

When the optical fiber coupling connector 100 is assembled, first, the light-emitting modules 14 and the light-receiving modules 16 are mounted on the second surface 124. Second, the support 189 is adhered by an adhesive agent to the second surface 124, so that the optical coupling module 18 is mounted on the second surface 124. In detail, a receiving room 10a is defined between the first optical surface 1822 and the circuit board 12. The light-emitting modules 14 and the light-receiving modules 16 are received in the receiving room 10a, and are aligned with the four first converging lenses 187, respectively. Third, the protecting member 19 is adhered by an adhesive agent to the second surface 124, so that the optical coupling module 18, the light-emitting modules 14, and the light-receiving modules 16 are received in the receiving cavity 190 and are spaced from the protecting member 19. In this situation, the rear wall 194 shields the back surface 184. The first sidewall 195 shields the first side surface 185. The second sidewall 196 shields the second side surface 186. The front surface 183 is exposed out of the second opening 1930. Fourth, the four core portions 22 are aligned with the four second converging lenses 188. When other electronic elements (not shown), such as capacitors or resistors, are mounted on the circuit board 12, the protecting member 19 protects the optical coupling module 18, the light-emitting modules 14, and the light-receiving modules 16, and prevents them from being damaged.

Figure 4:
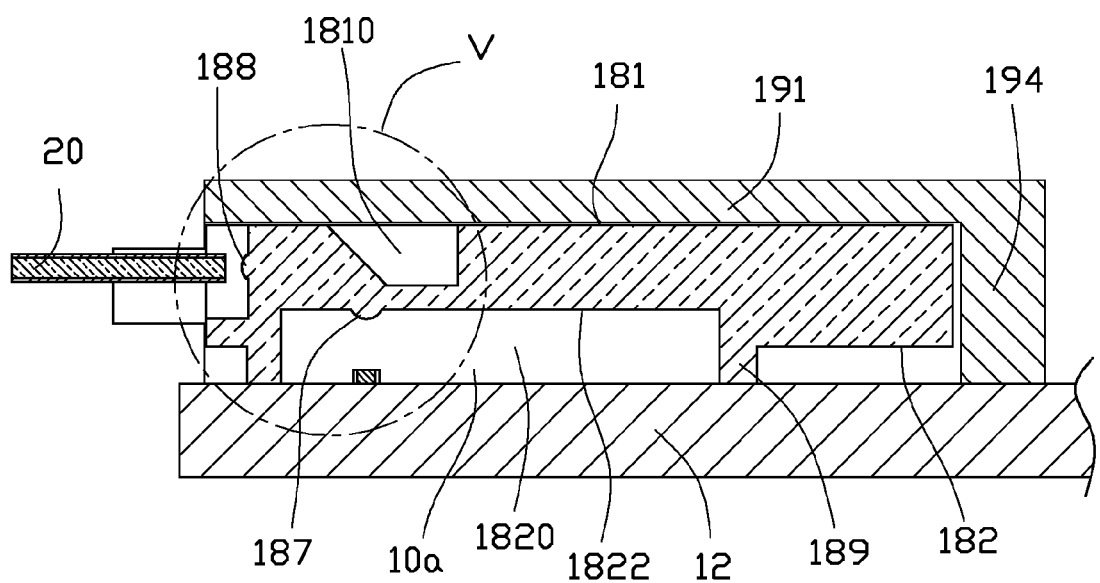
FIG. 4 is a cross-sectional view of the optical fiber coupling connector of FIG. 1, taken along line IV-IV.
Figure 5:
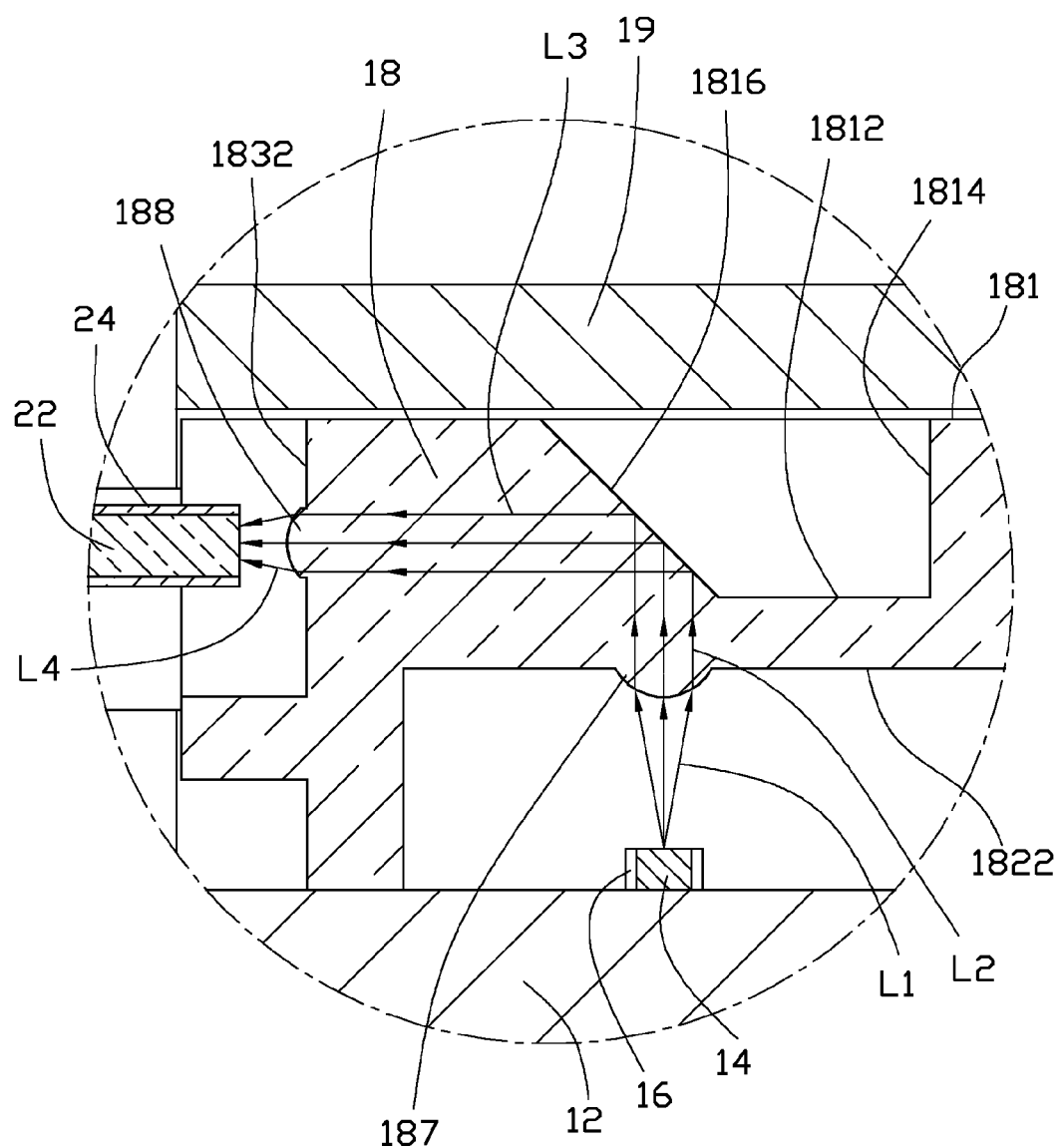
FIG. 5 is an enlarged view of section V of the optical fiber coupling connector of FIG. 4.

Referring to FIGS. 4-5, when the optical fiber coupling connector 100 is in use, electrical power is applied to the light-emitting modules 14 and the light-receiving modules 16 via the circuit board 12. Thus, light beams L1 emitted from each of the light-emitting modules 14 pass through the corresponding first converging lenses 187 and become parallel light beams L2. The parallel light beams L2 are reflected toward the corresponding second converging lenses 188 by the reflection surface 1816 to become parallel light beams L3. The parallel light beams L3 are converged to light beams L4 through the corresponding second converging lenses 188. The converged light beams L4 enter the corresponding core portions 22 of each of the optical fibers 20.

Figure 6:
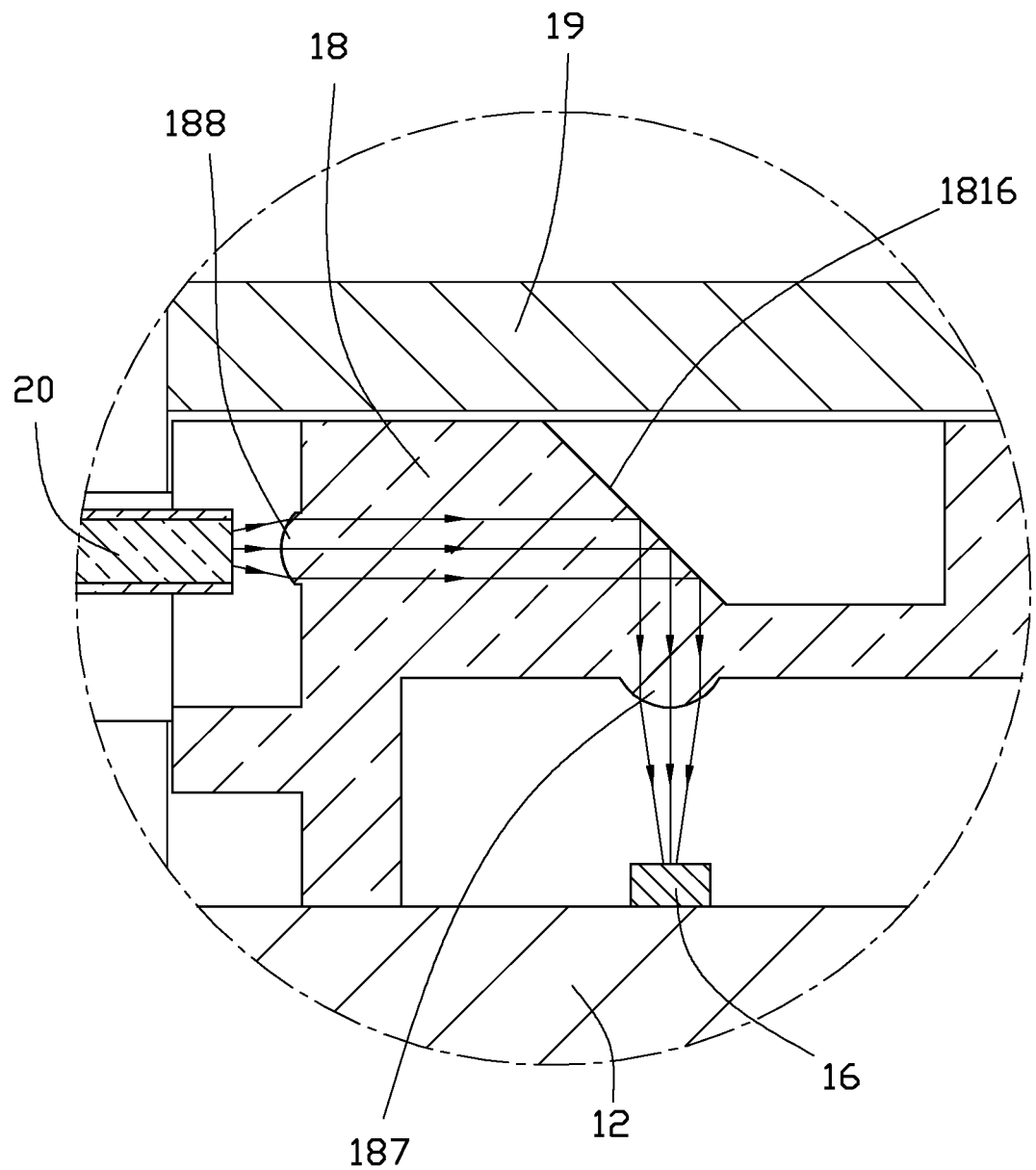
FIG. 6 is a partial, enlarged, cross-sectional view of the optical fiber coupling connector of FIG. 1, taken along line VI-VI.

Accordingly, referring to FIG. 6, light beams from the optical fibers 20 become parallel light beams after passing through the second converging lenses 188. The parallel light beams are reflected by the reflection surface 1816 toward the first converging lenses 187, and finally enter the light-receiving modules 16.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A photoelectric conversion device comprising:
a circuit board;
a plurality of light-emitting modules mounted on the circuit board;
a plurality of light-receiving modules mounted on the circuit board and being apart from the light-emitting modules; and
an optical coupling module mounted on the circuit board and comprising a first optical surface, a second optical surface perpendicular to the first optical surface, a reflection surface oblique relative to the first optical surface and the second optical surface, a plurality of first converging lenses formed in the first optical surface, and a plurality of second converging lenses formed on the second optical surface corresponding to the first converging lenses, the first converging lenses aligned with the light-emitting modules and the light-receiving modules, the reflection surface configured to reflect parallel light beams from the first converging lenses toward the second converging lenses and to reflect parallel light beams from the second converging lenses toward the first converging lenses; and
a protecting member mounted on the circuit board, the protecting member shielding the optical coupling module, the light-emitting modules, and the light-receiving modules, and the second converging lenses exposed outside the protecting member.

2. The photoelectric conversion device as claimed in claim 1, wherein the protecting member is made of polypropylene or ceramic.

3. The photoelectric conversion device as claimed in claim 1, wherein the optical coupling module further comprises a top surface, a bottom surface opposite to the top surface, a front surface, a back surface opposite to the front surface, a first side surface, and a second side surface, the front surface, the first side surface, the back surface, and the second side surface are connected to each other end-to-end and are interconnected between the top surface and the bottom surface, the front surface defines a cutout having the second optical surface substantially parallel to the front surface, and the protecting member shields the back surface, the first side surface and the second side surface and exposed at the front surface.

4. The photoelectric conversion device as claimed in claim 3, wherein the protecting member comprises a top wall, a bottom wall opposite to the top wall, a front wall, a rear wall opposite to the front wall, a first sidewall, and a second sidewall opposite to the first sidewall, the front wall, the first sidewall, the rear wall, and the second sidewall are interconnected between the top wall and the bottom wall, the front wall, the first sidewall, the rear wall, and the second sidewall are connected to each other end-to-end and form a receiving cavity with the top wall and the bottom wall, the bottom wall is supported on the circuit board and defines a first opening communicating with the receiving cavity, the front wall defines a second opening communicating with the receiving cavity, the optical coupling module, the first light-emitting modules, and the light-receiving modules are received in the receiving cavity, the rear wall shields the back surface, the first sidewall shields the first side surface, the second sidewall shields the second side surface, and the front surface is exposed from the front wall through the second opening.

5. The photoelectric conversion device as claimed in claim 4, wherein the top surface defines an elongated top recess having a first inner surface parallel to the top surface, a second inner surface perpendicularly interconnected between the first inner surface and the top surface, and the reflection surface obliquely interconnected between the first inner surface and the top surface, the bottom surface defines a bottom recess having the first optical surface at the bottom thereof, and the first optical surface is substantially parallel to the top surface and the bottom surface.

6. The photoelectric conversion device as claimed in claim 5, wherein a support depends from the bottom surface, the bottom recess is rectangular, the support extends along four edges of the bottom recess, the support is adhered to the circuit board thereby a receiving room is defined between the first optical surface and the circuit board, and the light-emitting modules and the light-receiving modules are received in the receiving room.

7. The photoelectric conversion device as claimed in claim 6, wherein an included angle between a main plane of the first optical surface and a main plane of the reflection surface is about 45 degrees, and an included angle between a main plane of the second optical surface and a main plane of the reflection surface is about 45 degrees.

8. The photoelectric conversion device as claimed in claim 6, wherein the first converging lenses are arranged in a straight line, and the second converging lenses are arranged in a straight line corresponding to the first converging lenses.

9. The photoelectric conversion device as claimed in claim 6, wherein each of the first converging lenses is a convex lens, and each of the second converging lenses is a convex lens.

10. An optical fiber coupling connector comprising:
a photoelectric conversion device comprising:
a circuit board;
a plurality of light-emitting modules mounted on the circuit board;
a plurality of light-receiving modules mounted on the circuit board and being apart from the light-emitting modules; and
an optical coupling module mounted on the circuit board and comprising a first optical surface, a second optical surface perpendicular to the first optical surface, a reflection surface oblique relative to the first optical surface and the second optical surface, a plurality of first converging lenses formed in the first optical surface, and a plurality of second converging lenses formed on the second optical surface corresponding to the first converging lenses, the first converging lenses aligned with the light-emitting modules and the light-receiving modules, the reflection surface configured to reflect parallel light beams from the first converging lenses toward the second converging lenses and to reflect parallel light beams from the second converging lenses toward the first converging lenses; and a protecting member mounted on the circuit board, the protecting member shielding the optical coupling module, the light-emitting modules, and the light-receiving modules, and the second converging lenses exposed outside the protecting member; and
a plurality of optical fibers each comprising a core portion and a cladding layer, and the core portions aligned with the respective second converging lenses.

11. The optical fiber coupling connector as claimed in claim 10, wherein the protecting member is made of polypropylene or ceramic.

12. The optical fiber coupling connector as claimed in claim 10, wherein the optical coupling module further comprises a top surface, a bottom surface opposite to the top surface, a front surface, a back surface opposite to the front surface, a first side surface, and a second side surface, the front surface, the first side surface, the back surface, and the second side surface are connected to each other end-to-end and are interconnected between the top surface and the bottom surface, the front surface defines a cutout having the second optical surface substantially parallel to the front surface, and the protecting member shields the back surface, the first side surface and the second side surface and exposed at the front surface.

13. The optical fiber coupling connector as claimed in claim 12, wherein the protecting member comprises a top wall, a bottom wall opposite to the top wall, a front wall, a rear wall opposite to the front wall, a first sidewall, and a second sidewall opposite to the first sidewall, the front wall, the first sidewall, the rear wall, and the second sidewall are interconnected between the top wall and the bottom wall, the front wall, the first sidewall, the rear wall, and the second sidewall are connected to each other end-to-end and form a receiving cavity with the top wall and the bottom wall, the bottom wall is supported on the circuit board and defines a first opening communicating with the receiving cavity, the front wall defines a second opening communicating with the receiving cavity, the optical coupling module, the first light-emitting modules, and the light-receiving modules are received in the receiving cavity, the rear wall shields the back surface, the first sidewall shields the first side surface, the second sidewall shields the second side surface, and the front surface is exposed from the front wall through the second opening.

14. The optical fiber coupling connector as claimed in claim 13, wherein the top surface defines an elongated top recess having a first inner surface parallel to the top surface, a second inner surface perpendicularly interconnected between the first inner surface and the top surface, and the reflection surface obliquely interconnected between the first inner surface and the top surface, the bottom surface defines a bottom recess having the first optical surface at the bottom thereof, and the first optical surface is substantially parallel to the top surface and the bottom surface.

15. The optical fiber coupling connector as claimed in claim 14, wherein a support depends from the bottom surface, the bottom recess is rectangular, the support extends along four edges of the bottom recess, the support is adhered to the circuit board thereby a receiving room is defined between the first optical surface and the circuit board, and the light-emitting modules and the light-receiving modules are received in the receiving room.

16. The optical fiber coupling connector as claimed in claim 15, wherein an included angle between a main plane of the first optical surface and a main plane of the reflection surface is about 45 degrees, and an included angle between a main plane of the second optical surface and a main plane of the reflection surface is about 45 degrees.

17. The optical fiber coupling connector as claimed in claim 15, wherein the first converging lenses are arranged in a straight line, and the second converging lenses are arranged in a straight line corresponding to the first converging lenses.

18. The optical fiber coupling connector as claimed in claim 15, wherein each of the first converging lenses is a convex lens, and each of the second converging lenses is a convex lens.

\* \* \* \* \*